(12) United States Patent
Ikenaga

(10) Patent No.: US 10,025,743 B2
(45) Date of Patent: Jul. 17, 2018

(54) SEMICONDUCTOR DEVICE, SEMICONDUCTOR SYSTEM INCLUDING SAME, AND SEMICONDUCTOR DEVICE CONTROL METHOD

(71) Applicant: Renesas Electronics Corporation, Tokyo (JP)

(72) Inventor: Yoshifumi Ikenaga, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 158 days.

(21) Appl. No.: 15/095,034

(22) Filed: Apr. 9, 2016

(65) Prior Publication Data

US 2016/0342552 A1    Nov. 24, 2016

(30) Foreign Application Priority Data

May 22, 2015  (JP) ................................ 2015-104579

(51) Int. Cl.
| G06F 13/14 | (2006.01) |
| G06F 13/20 | (2006.01) |
| G06F 13/40 | (2006.01) |
| G06F 13/36 | (2006.01) |

(52) U.S. Cl.
CPC .......... *G06F 13/4068* (2013.01); *G06F 13/36* (2013.01)

(58) Field of Classification Search
None
See application file for complete search history.

(56) References Cited

U.S. PATENT DOCUMENTS

| 4,841,162 A  * | 6/1989 | Lay ..................... H01H 47/002 307/112 |
| 2002/0050861 A1* | 5/2002 | Nguyen ............... H03F 1/3211 330/254 |
| 2005/0122646 A1* | 6/2005 | Okushima .......... H01L 27/0288 361/56 |
| 2010/0001685 A1* | 1/2010 | Eastlack ................ H02J 7/025 320/108 |
| 2011/0002080 A1* | 1/2011 | Ranta .................. H03M 1/1061 361/277 |

(Continued)

FOREIGN PATENT DOCUMENTS

JP     2008-158700 A    7/2008

*Primary Examiner* — Michael Sun
(74) *Attorney, Agent, or Firm* — McGinn IP Law Group, PLLC

(57) ABSTRACT

The invention aims at providing a semiconductor device, a semiconductor system including same, and a semiconductor device control method enabling it to correctly judge that a module has been coupled to and decoupled from a communication bus. According to one embodiment, a host controller includes a variable resistance element and a control circuit that varies the resistance value of the variable resistance element so that the potential of a potential detecting line which is determined by the variable resistance element and a resistance element provided in each of modules will fall within a predefined range. It is thus possible to keep that potential varying to a certain extent or more due to coupling and decoupling of a module to/from the communication bus. It is therefore possible to correctly judge that a module has been coupled/decoupled to/from the communication bus.

20 Claims, 8 Drawing Sheets

(56) References Cited

U.S. PATENT DOCUMENTS

| | | | |
|---|---|---|---|
| 2011/0080770 A1* | 4/2011 | Muraoka | G11C 13/0007 365/148 |
| 2013/0335135 A1* | 12/2013 | Chen | H04L 25/0272 327/509 |
| 2014/0035689 A1* | 2/2014 | Ozawa | H03B 5/364 331/158 |
| 2015/0084681 A1* | 3/2015 | Bianchi | B32B 27/32 327/308 |

* cited by examiner

SEMICONDUCTOR DEVICE, SEMICONDUCTOR SYSTEM INCLUDING SAME, AND SEMICONDUCTOR DEVICE CONTROL METHOD

CROSS-REFERENCE TO RELATED APPLICATIONS

The disclosure of Japanese Patent Application No. 2015-104579 filed on May 22, 2015 including the specification, drawings and abstract is incorporated herein by reference in its entirety.

BACKGROUND

The present invention relates to a semiconductor device, a semiconductor system including same, and a semiconductor device control method. The invention relates to a semiconductor device, a semiconductor system including same, and a semiconductor device control method which are suitable for correctly judging that, for example, any module has been coupled to and decoupled from a communication bus.

For data communication between a controller and a module, a communication scheme, I2C (Inter-Integrated Circuit) is widely used. In I2C communication, since a controller and plural modules can be coupled through a shared bus, the number of wiring lines for signal transmission can be decreased.

In I2C communication, after a controller (master) transmits a data write or read command to a module (slave), when the controller has received a reply (ACK signal) to the transmission from the module, it actually performs data write or read.

In this regard, after transmitting a data write or read command to a module, the controller can become aware of failure or decoupling of the module only when it has failed to receive a reply to the transmission from the module properly.

However, in such a framework, for example, let us suppose that the controller gives a command to perform steady operation to a module having a moving part, such as a motor; even if the module has been decoupled from the bus during its operation, the controller would misjudge that the module performs steady operation until giving a different command from the one for steady operation to the module. In consequence, there is a possibility of system malfunction occurring.

A solution to this problem is disclosed in Patent Document 1. A coupling detection device disclosed in Patent Document 1 includes a coupling detector circuit in which potential at point A varies when an external unit has been coupled to a coupling detecting terminal, an AD converter which outputs a digital signal corresponding to the potential at point A, and a coupling detection controller which judges whether or not an external unit is being coupled to the coupling detecting terminal according to a signal output by the AD converter. Thereby, a main unit (controller) equipped with the coupling detection device can judge the coupling/decoupling of an external unit promptly.

RELATED ART DOCUMENT

Patent Document

[Patent Document 1]
Japanese Unexamined Patent Application Publication No. 2008-158700

SUMMARY

However, in the structure disclosed in Patent Document 1, for example, when an external unit having a small value of resistance has been coupled or when many external units have been coupled, the potential at point A decreases more than necessary, in consequence of which the potential at point A will vary to only a small extent upon the coupling and the decoupling of an external unit occurring subsequently. This posed a problem in which it cannot be judged correctly that an external unit has been coupled and decoupled. Other problems and novel features will be apparent from the description in the present specification and the attached drawings.

According to one embodiment, a semiconductor device includes a first variable resistance element and a control circuit that varies the resistance value of the variable resistance element so that the potential of a first potential detecting line which is determined by the variable resistance element and a first resistance element provided in each of one or more external modules will fall within a predefined range.

Besides, according to one embodiment, a semiconductor device control method includes varying the resistance value of a first variable resistance element so that the potential of a first potential detecting line which is determined by the first variable resistance element and a first resistance element which is provided in each of one or more external modules will fall within a predefined range and judging whether or not each of the one or more modules is being coupled to the semiconductor device through a signal line in accordance with the potential of the first potential detecting line determined after the resistance value of the first variable resistance element is varied.

According to the above embodiments, it is possible to provide a semiconductor device, a semiconductor system including same, and a semiconductor device control method enabling it to correctly judge that, for example, any module has been coupled to and decoupled from a communication bus.

DETAILED DESCRIPTION

Embodiments will be described below with reference to the drawings. Because these drawings are simplified ones, the technical scope of embodiments should not be interpreted narrowly on grounds of the contents of these drawings. Corresponding elements are assigned the same referential designators and their duplicated descriptions are omitted.

In the following description of embodiments, an embodiment is divided into plural sections or embodiments, when necessary for convenience sake, and these sections or embodiments are described; they are not independent of each other, unless otherwise specified, and they relate to one another such that one is an example of modification to, an example of application of, detailed description, or supplementary description, etc. of another in part or whole. In the following description of embodiments, where the number of elements among others (including the number of pieces, a numeric value, quantity, range, etc.) is mentioned, that number should not be limited to a particular number mentioned and may be more or less than the particular number, unless otherwise specified and unless that number is, in principle, obviously limited to the particular number.

Besides, for an embodiment which will be described below, needless to say, its components (including operational steps or the like) are not always necessary, unless otherwise specified and unless such components are, in principle, considered to be necessary obviously. Likewise, in an embodiment which will be described below, when the shape of a component or the like, a positional relation between components, etc. are described, such description should be construed to include those that are substantially similar or analogous to the shape, etc., unless otherwise specified and unless such description is, in principle, considered to be obviously exclusive. This is also true for the above-mentioned number among others (including the number of pieces, a numeric value, quantity, range, etc.).

First Embodiment

Figure 1:
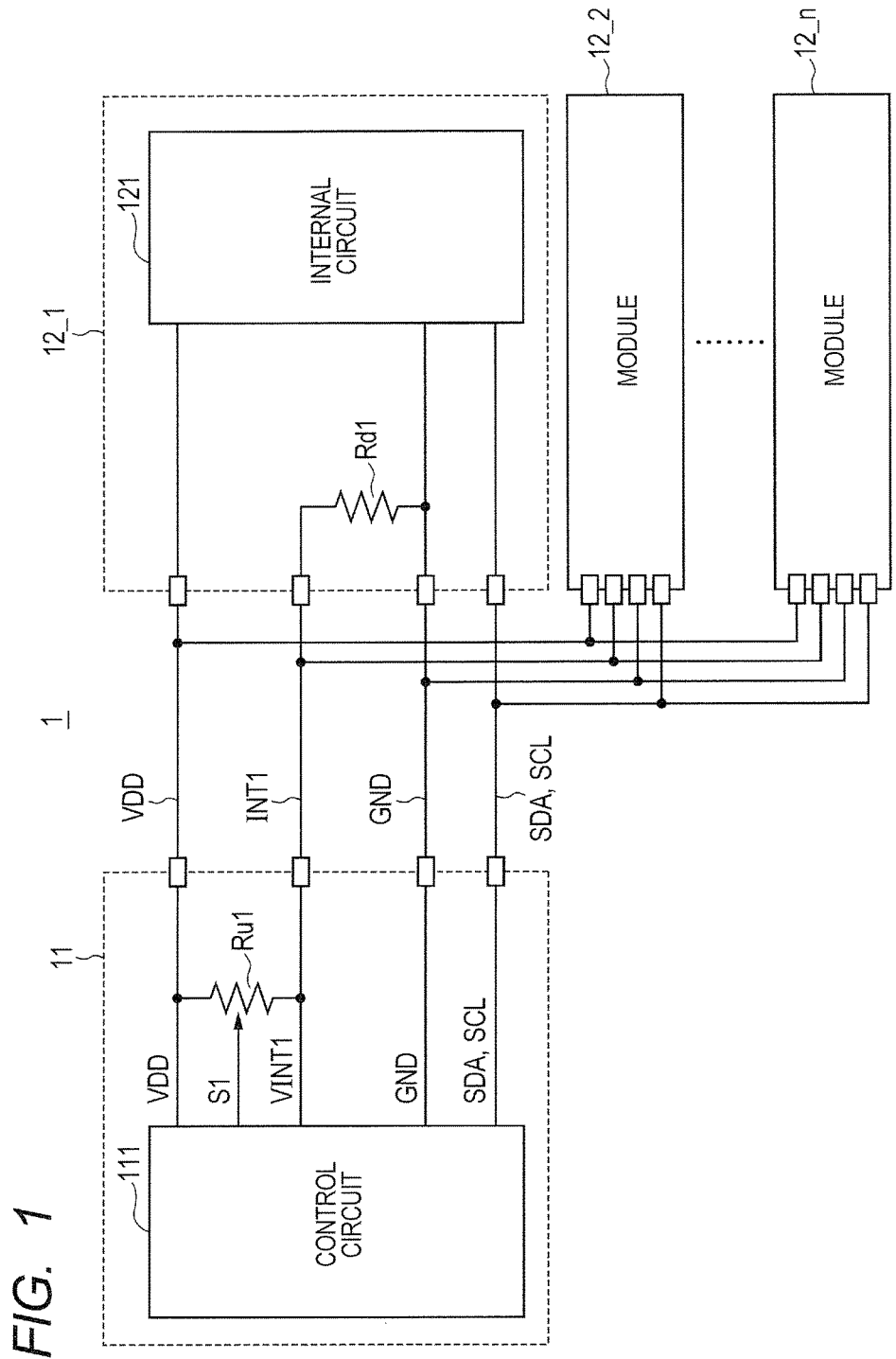
FIG. 1 is a block diagram depicting an example of configuration of a semiconductor system pertaining to a first embodiment.

FIG. 1 is a diagram depicting a semiconductor system 1 pertaining to a first embodiment. In the semiconductor system 1 pertaining to the present embodiment, a host controller 11 regulates the resistance value of a variable resistance element Ru1 so that the potential VINT1 of a potential detecting line INT1 which is determined by the variable resistance element Ru1 and a resistance element Rd1 which is provided in each of modules 12_1 to 12_n (where n is an integer more than 1) will fall within a predefined range. It is thus possible to keep the potential of the potential detecting line varying greatly to a certain extent or more due to, inter alia, the coupling of a new module to a communication bus B1 and the decoupling of one of the modules 12_1 to 12_n from the communication bus B1. It is therefore possible to correctly judge that a new module has been coupled to the communication bus B1 and one of the modules 12_1 to 12_n has been decoupled from the communication bus B1 among others. Concrete descriptions will be provided below.

As depicted in FIG. 1, the semiconductor system 1 includes a host controller (semiconductor device) 11, modules 12_1 to 12_n (where n is an integer more than 1), a communication bus B1 which couples the host controller 1 with the modules 12_1 to 12_n, and a potential detecting line (first potential detecting line) INT1. The communication bus B1 is comprised of, at least, a power supply line VDD, a ground line GND, a clock signal line SCL, and a data signal line SDA.

The power supply line VDD, ground line GND, signal line SCL and signal line SDA which make up the communication bus B1 and the potential detecting line INT1 are shared by the host controller and the modules 12_1 to 12_n via connectors of the host controller 11, bus cable, and connectors of the modules 12_1 to 12_n.

In the present embodiment, descriptions are provided for an example where I2C is used as a scheme of data communication between the host controller 11 and the modules 12_1 to 12_n; this is non-limiting, however, and other communication schemes in which communication is performed through one communication bus may be used.

Host Controller 11

The host controller 11 is comprised of one or plural chips and includes a control circuit 111 and the resistance element (first variable resistance element) Ru1.

The control circuit 111 is, for example, a microcomputer and performs data communication with the modules 12_1 to 12_n through the communication bus B1.

Also, the control circuit 111 has a function of detecting decoupling of a module which was coupled to the communication bus and coupling of a new module to the communication bus, based on variation in the potential VINT1 of the potential detecting line INT1.

Moreover, the control circuit 111 has a function of adjusting the potential VINT1 of the potential detecting line INT1 by regulating the resistance value of the variable resistance element Ru1.

The variable resistance element Ru1 is provided between the power supply line VDD and the potential detecting line INT1. That is, in the preset example, the variable resistance element Ru1 is used as a pull-up resistor. The resistance value of the variable resistance element Ru1 is varied by a control signal S1 from the control circuit 111.

Example of Concrete Configuration of the Variable Resistance Element Ru1

Figure 2:
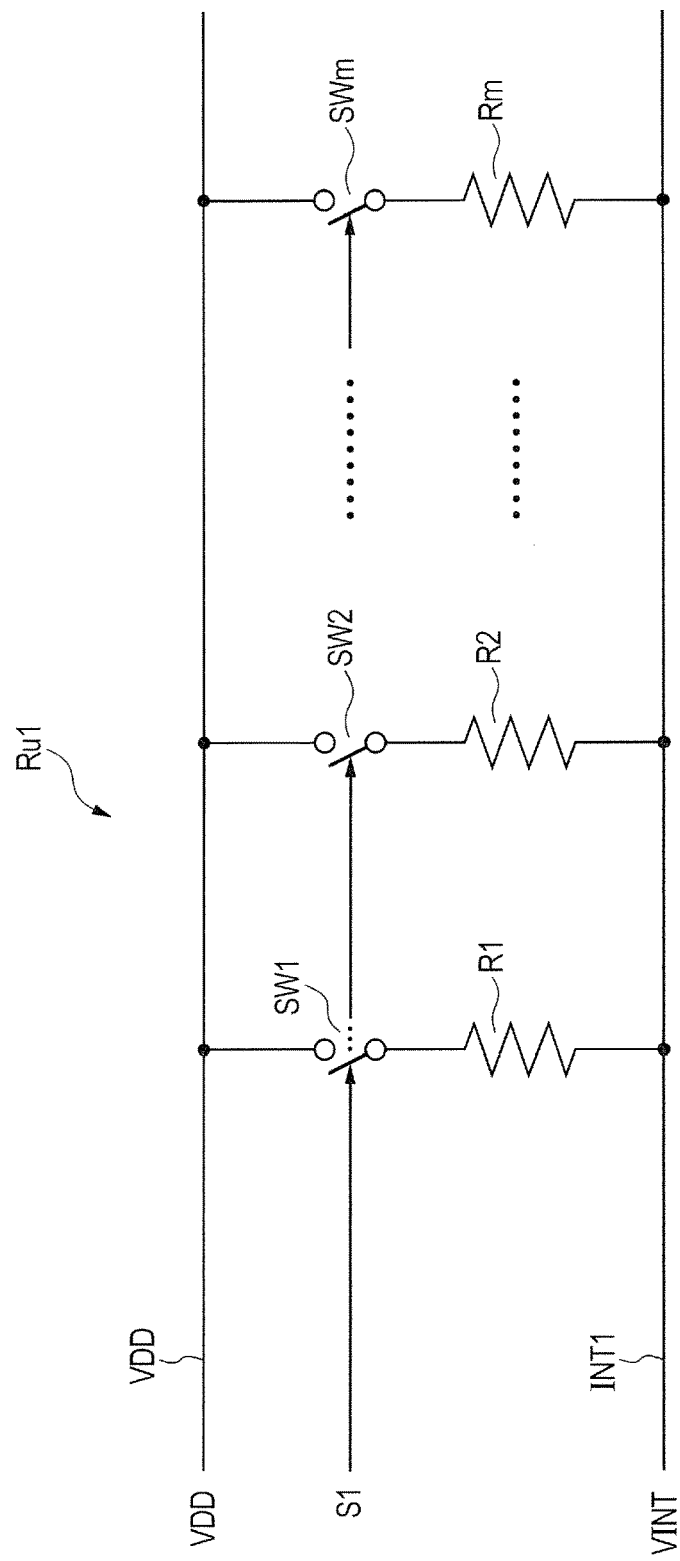
FIG. 2 is a diagram depicting an example of concrete configuration of a variable resistance element provided in a host controller of the semiconductor system depicted in FIG. 1.

FIG. 2 is a diagram depicting an example of concrete configuration of the variable resistance element Ru1. As depicted in FIG. 2, the variable resistance element Ru1 includes plural resistance elements R1 to Rm (where m is an integer more than 2) coupled in parallel between the power supply line VDD and the potential detecting line INT1 and switches SW1 to SWm each coupled in series with each resistance element R1 to Rm.

A resistance element Ri (where i is any given value from 1 to m) has a resistance value of, e.g., $2^{(i-1)}$ kΩ. That is, the resistance values of resistance elements R1, R2, R3, and Rm are 1 kΩ, 2 kΩ, 4 kΩ, and $2^{(m-1)}$ kΩ, respectively. Here, turn-on of any one of the switches SW1 to SWm determines the resistance value of the variable resistance element Ru1.

Modules 12_1 to 12_n

A module 12_1 includes an internal circuit 121 and a resistance element (first resistance element) Rd1. The resistance element Rd1 may be provided externally to the module 12_1. That is, the resistance element Rd1 may be externally attached to the module 12_1.

The resistance element Rd1 is provided between the potential detecting line INT1 and the ground line GND. That is, in the present example, the resistance element Rd1 is used as a pull-down resistor.

The configurations of modules 12_2 to 12_n are the same as for the module 12_1 and, therefore, their descriptions are omitted.

Operation of the Semiconductor System 1

Subsequently, operation of the semiconductor system 1 is described.

Figure 3:
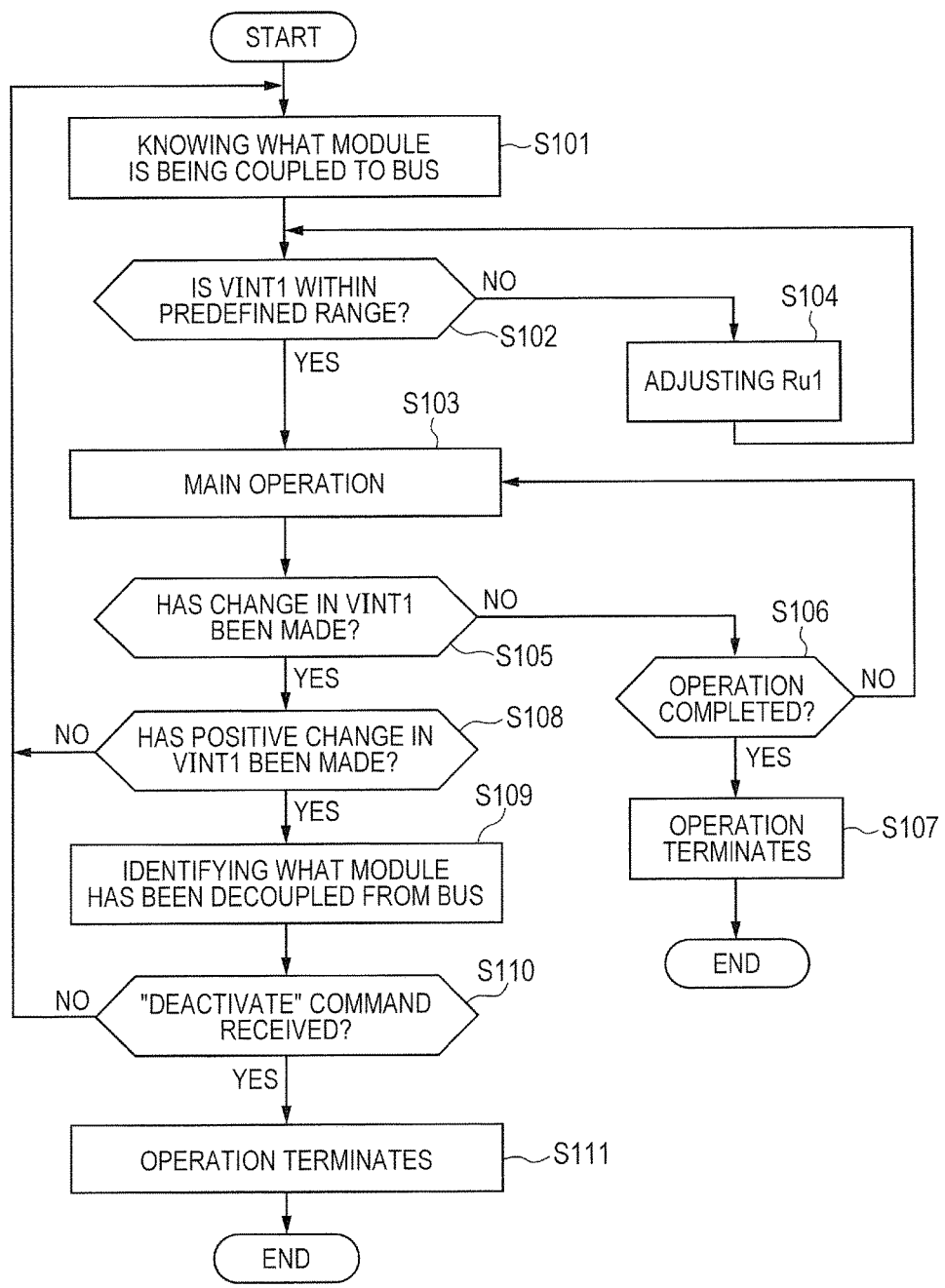
FIG. 3 is a flowchart illustrating operation of the semiconductor system depicted in FIG. 1.

FIG. 3 is a flowchart illustrating operation of the semiconductor system 1. Descriptions are provided for an example where the number of modules being coupled to the communication bus B1 is one.

When the semiconductor system 1 is started up, first, the host controller 11 performs a processing step to know what module 12_1 is being coupled to the communication bus B1 (step S101).

In particular, the control circuit 111 transmits all slave addresses and judges that a module which has replied to the transmission is being coupled to the communication bus B1.

After that, the control circuit 111 measures the potential VINT1 of the potential detecting line INT1. For example, the control circuit 111 converts the potential VINT1 to a digital value using an AD converter and, then, measures the potential VINT1 based on the digital value.

The potential VINT1 of the potential detecting line INT1 is determined, based on the variable resistance element Ru1 provided in the host controller 11 and n pieces of resistance elements R1 provided in the modules 12_1 to 12_n respectively.

For example, if the power supply voltage VDD is 5 V, the resistance value of the resistance element Rd1 is 100 kΩ, and the resistance value of the variable resistance element Ru1 is 1 kΩ, the potential VINT1 is 4.95 V (=0.99×VDD).

Here, given that the module 12_1 has been decoupled from the communication bus B1, the potential VINT1 changes from 4.95 V to 5 V, but its variation ΔVINT1 is as small as 0.05 V. If this value is smaller than the resolution of the AD converter present in the control circuit 111, it is hard to detect that the module 12_1 has been decoupled from the communication bus B1.

Therefore, if the potential VINT1 falls out of the predefined range (e.g. out of a range from 0.2 to 0.8 times as large as the power supply voltage VDD) (NO as decided at step S102), the control circuit 111 regulates the resistance value of the variable resistance element Ru1 so that the potential VINT1 will fall within the predefined range (step S104). For example, the control circuit 111 changes the resistance value of the variable resistance element Ru1 to 32 kΩ. Thereby, the potential VINT1 becomes 3.78 V (=0.76×VDD); i.e., the potential VINT1 becomes falling within the predefined range.

When the potential VINT1 becomes falling within the predefined range (YES as decided at step S102), the host controller 11 starts data communication with the module 12_1 (main operation) (step S103).

During main operation, the control circuit 111 measures the potential VINT1 periodically (e.g., once for 1 ms).

If no change in the potential VINT1 has been made (NO as decided at step S105), the host controller continues the main operation (No as decided at step S106→step S103), judging that the module 12_1 has not been decoupled from the communication bus B1 and a new module has not been coupled to the communication bus B1. Upon completion of the main operation (YES as decided at step S106), for example, the operation terminates (step S107).

But, if change in the potential VINT1 has been made (YES as decided at step S105), then, the polarity of change of the potential VINT1 is judged.

If, for example, a negative change in the potential VINT1 has been made (NO as decided at step S108), it means that the resistance value of the pull-down resistor has decreased. This means that a new model has been coupled to the communication bus B1.

If, in particular, the potential VINT1 has changed from 3.78 V to 3.05 V negatively, it indicates that one new module has been coupled to the communication bus B1. At this time, the variation ΔVINT1 of the potential VINT1 is as large as 0.73 V and, therefore, it is possible to correctly detect that a new module has been coupled to the communication bus B1.

If a new module has been coupled to the communication bus B1, the host controller 11 performs the processing step to know what module is being coupled to the communication bus again (step S101). Subsequently, the processing steps S102 to S108 are performed.

On the other hand, if a positive change in the potential VINT1 has been made (YES as decided at step S108), it means that the resistance value of the pull-down resistor has increased. This means that a module coupled to the communication bus B1 has been decoupled.

If, in particular, the potential VINT1 has changed from 3.78 V to 5 V, it indicates that one module 12_1 coupled to the communication bus B1 has been decoupled. At this time, the variation ΔVINT1 of the potential VINT1 is as large as 1.22 V and, therefore, it is possible to correctly detect that the module 12_1 has been decoupled from the communication bus B1.

After that, the host controller 11 performs a processing step to identify what module has been decoupled from the communication bus B1 (step S109).

In particular, in the host controller 11, the control circuit 111 transmits the slave addresses of all modules coupled to the communication bus B1 (one module 12_1 in this example) and judges that a module with a slave address which does not reply to the transmission has been decoupled from the communication bus B1.

After that, if the host controller 11 has received a "deactivate" command (YES as decided at step S110) in consequence of that the module 12_1 has been decoupled from the communication bus B1, it terminates the operation (step S111). In a case where plural modules are coupled to the bus, if the host controller has not received a "deactivate" command (NO as decided at step S110) even though a module has been decoupled from the communication bus B1, it continues the operation (step S101).

As will be appreciated from the foregoing, the semiconductor system 1 pertaining to the present embodiment is provided with the potential detecting line INT1 through which the potential VINT1 for detecting the coupling of a module to the communication bus B1 and the decoupling of a module from the communication bus B1 is generated. The host controller 11 provided in the semiconductor system 1 regulates the resistance value of the variable resistance element Ru1 so that the potential VINT1 of the potential detecting line INT1 which is determined by the variable resistance element Ru1 and a resistance element Rd1 which is provided in each module will fall within a predefined range. It is thus possible to keep the potential VINT1 varying greatly to a certain extent or more due to, inter alia, the coupling of a module to the communication bus B1 and the decoupling of a module from the communication bus B1. It is therefore possible to correctly judge that a module has been coupled to the communication bus B1 and a module has been decoupled from the communication bus B1 among others.

In the present embodiment, descriptions have been provided for an example where the variable resistance element Ru1 is used as a pull-up resistor for the potential VINT1 and the resistance element Rd1 is used as a pull-down resistor for the potential VINT1; however, this is non-limiting. The semiconductor system 1 can be modified appropriately to have another configuration in which the potential VINT1 can be determined, based on the variable resistance element Ru1 and a resistance element Rd1.

In the present embodiment, descriptions have been provided for an example where the number of modules coupled to the communication bus B1 is one; however, this is non-limiting. As the number of modules coupled to the communication bus B1 increases, the semiconductor system 1 pertaining to the present embodiment will perform more effectively. This is briefly described below.

First, the potential VINT1 of the potential detecting line INT1 is expressed by the following equation (1).

[Equation 1]

$$VINT1 = \frac{1}{na+1} VDD \quad (1)$$
$$a = \frac{Ru1}{Rd1}$$

As will be seen from Equation (1), the potential VINT1 decreases with increase in the number n of modules which are coupled to the communication bus B1.

The variation $\Delta$VINT1 of the potential VINT1, when one of the n pieces of modules has been decoupled from the communication bus B1, is expressed by the following equation (2).

[Equation 2]

$$\Delta VINT1 = \frac{a}{(na+1)[(n-1)a+1]} VDD \quad (2)$$

As will be seen from Equation (2), the variation $\Delta$VINT1 of the potential VINT1, when one of the n pieces of modules has been decoupled from the communication bus B1, decreases with increase in the number n of modules which are coupled to the communication bus B1.

Put plainly, according to Equations (1) and (2), the variation $\Delta$VINT1 of the potential VINT1, when one of the n pieces of modules has been decoupled from the communication bus B1, decreases with increase in the number n of modules which are coupled to the communication bus B1. Here, if the variation $\Delta$VINT1 is smaller than the resolution of the AD converter present in the control circuit 111, it becomes hard to detect the coupling of a module to the communication bus B1 and the decoupling a module from the communication bus B1.

For example, if the number n of modules coupled to the bus is 10, the power supply voltage VDD is 5 V, the resistance value of the resistance element Rd1 is 10 k$\Omega$, and the resistance value of the variable resistance element Ru1 is 8 k$\Omega$, the potential VINT1 is 0.56 V (=0.11×VDD).

Here, if one module has been decoupled from the communication bus B1, the variation $\Delta$VINT1 of the potential VINT1 is as small as 0.05 V. If this value is smaller than the resolution of the AD converter present in the control circuit 111, it is hard to detect the decoupling of the module from the communication bus B1.

Therefore, if the potential VINT1 falls out of the predefined range (e.g. out of a range from 0.2 to 0.8 times as large as the power supply voltage VDD), the control circuit 111 regulates the resistance value of the variable resistance element Ru1 so that the potential VINT1 will fall within the predefined range. For example, the control circuit 111 changes the resistance value of the variable resistance element Ru1 to 2 k$\Omega$. Thereby, the potential VINT1 becomes 1.67V (=0.33×VDD); i.e., the potential VINT1 becomes falling within the predefined range.

With the potential VINT1 falling within the predefined range, if one module has been decoupled from the communication bus B1, the variation $\Delta$VINT1 of the potential VINT1 is as large as 0.12 V. Consequently, it becomes possible to correctly judge that the module has been decoupled from the communication bus B1.

As will be appreciated from the foregoing, the semiconductor system 1 pertaining to the present embodiment makes it possible to keep the potential VINT1 varying to a large extent as the variation $\Delta$VINT1 by regulating the potential VINT1 to fall within a predefined range even in a case where many modules are being coupled to the communication bus B1. Thus, the semiconductor system 1 pertaining to the present embodiment enables it to correctly judge that a module has been decoupled from the communication bus B1 and a module has been coupled to the communication bus B1.

Second Embodiment

Figure 4:
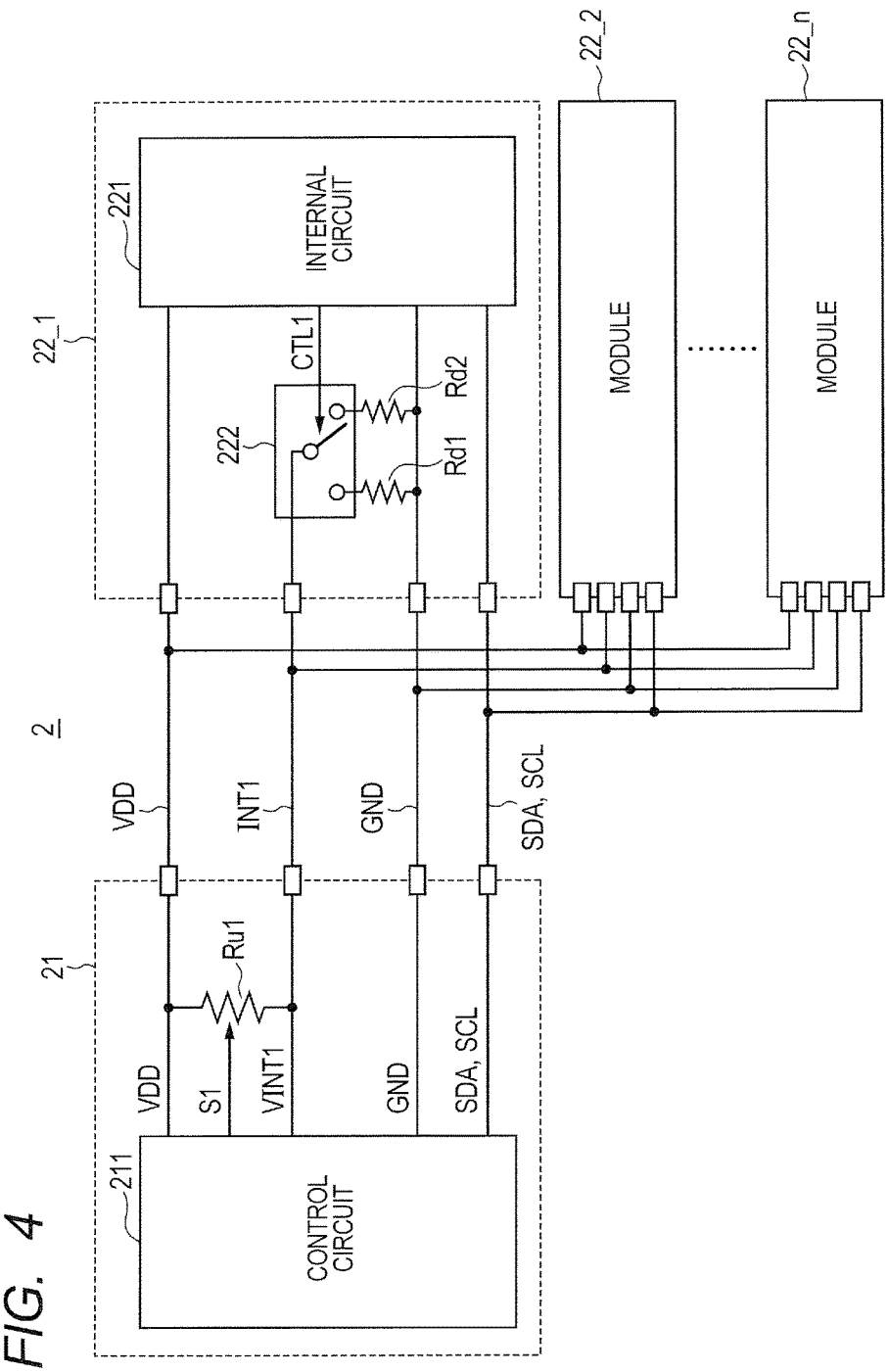
FIG. 4 is a block diagram depicting an example of configuration of a semiconductor system pertaining to a second embodiment.

FIG. 4 is a diagram depicting an example of configuration of a semiconductor system 2 pertaining to a second embodiment.

In comparison with the semiconductor system 1, difference lies in the configuration of each module in the semiconductor system 2. Concrete descriptions will be provided below.

As depicted in FIG. 4, the semiconductor system 2 includes a host controller (semiconductor device) 21, modules 22_1 to 22_n (where n is an integer more than 1), a communication bus B1 which couples the host controller 21 and the modules 22_1 to 22_n, and a potential detecting line INT1. The host controller 21 and modules 22_1 to 22_n correspond to the host controller 11 and modules 12_1 to 12_n respectively.

Host Controller 21

The host controller 21 includes a control circuit 211 and a variable resistance element Ru1. The control circuit 211 corresponds to the control circuit 111. The configuration and operation of the host controller 21 are the same as those of the host controller 11 and, therefore, their description is omitted.

Modules 22_1 to 22_n

A module 22_1 includes an internal circuit 221, a resistance element (first resistance element) Rd1, a resistance element (second resistance element) Rd2, and a selection circuit (first selection circuit) 222. The internal circuit 221 corresponds to the internal circuit 121. The resistance elements Rd1, Rd2 and the selection circuit 222 may be provided externally to the module 22_1. That is, the resistance elements Rd1, Rd2 and the selection circuit 222 may be externally attached to the module 22_1.

The resistance elements Rd1, Rd2 are provided in parallel between the potential detecting line INT1 and the ground line GND. In the present example, the resistance elements Rd1, Rd2 are used as pull-down resistors. Besides, in the present example, the resistance value of the resistance element Rd1 is larger than the resistance value of the resistance element Rd2.

The selection circuit 222 is provided between the potential detecting line INT1 and the resistance elements Rd1, Rd2 and selects and couples either of the resistance elements Rd1, Rd2 to the potential detecting line INT1 according to a control signal CTL1 supplied via the internal circuit 221 from the control circuit 211.

The configurations of modules 22_2 to 22_n are the same as for the module 22_1 and, therefore, their descriptions are omitted.

Operation of the Semiconductor System 2

Subsequently, operation of the semiconductor system 2 is described.

Figure 5:
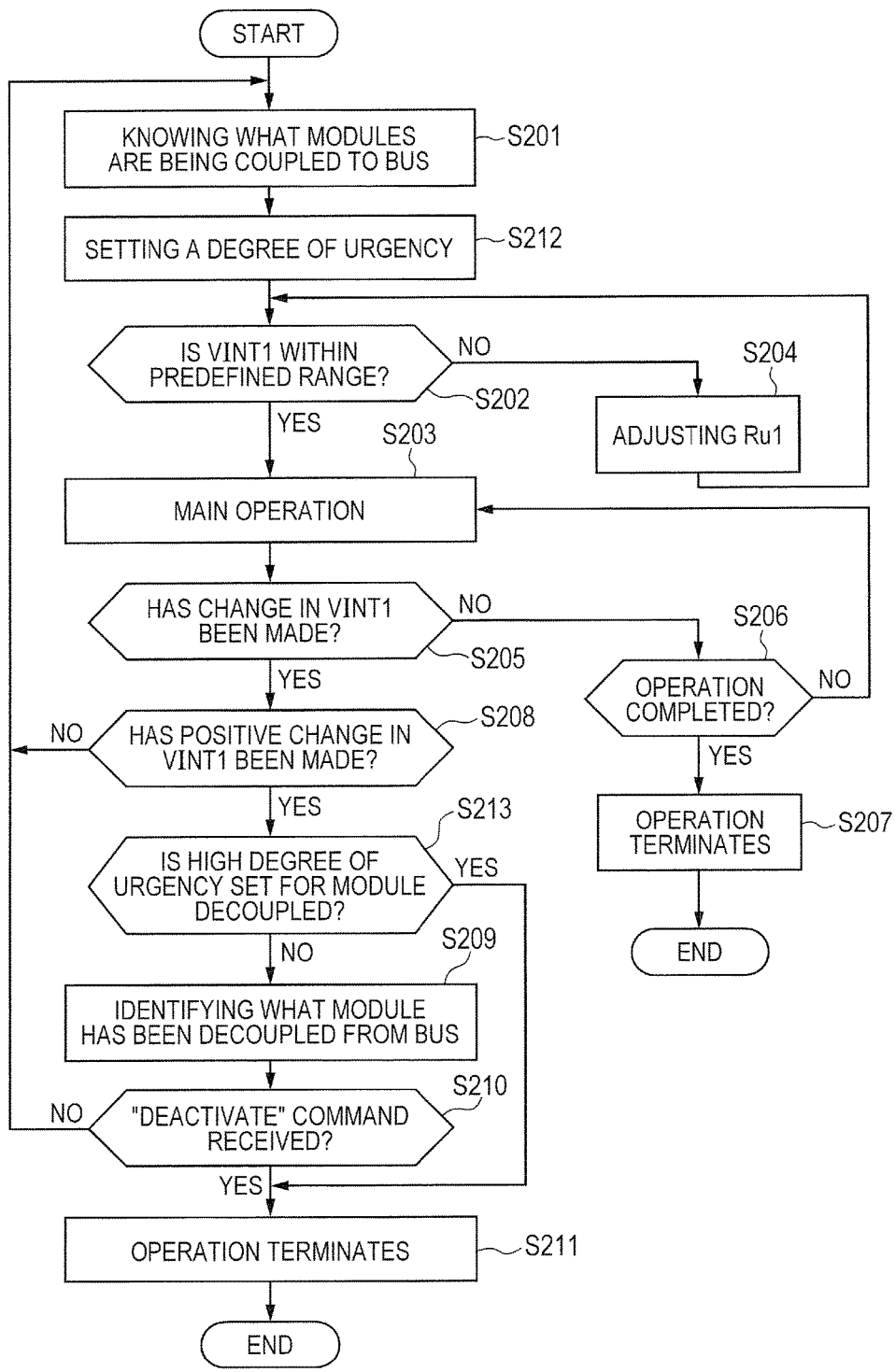
FIG. 5 is a flowchart illustrating operation of the semiconductor system depicted in FIG. 4.

FIG. 5 is a flowchart illustrating operation of the semiconductor system 2.

When the semiconductor system 2 is started up, first, the host controller 21 performs a processing step to know what modules 22_1 to 22_n are being coupled to the communication bus B1 (step S201).

After that, the host controller 21 sets a degree of urgency for each of the modules 22_1 to 22_n (step S212). In particular, the control circuit 211 sends each of the modules 22_1 to 22_n a command to couple either of the resistance elements Rd1, Rd2 in each of the modules 22_1 to 22_n to the potential detecting line INT1. In an initial state, the resistance element Rd1 is selected and coupled to the potential detecting line INT1.

For example, a high degree of urgency should be set for a module such as a motor, as the system operation has to be terminated immediately when the module has been decoupled from the communication bus B1. In particular, the resistance element Rd1 should be selected between the resistance elements Rd1, Rd2 and coupled to the potential detecting line INT1. On the other hand, a low degree of urgency should be set for a module such as a display, as the system operation does not have to be terminated immediately even when the module has been decoupled from the communication bus B1. In particular, the resistance element Rd2 should be selected between the resistance elements Rd1, Rd2 and coupled to the potential detecting line INT1.

After that, the control circuit 211 measures the potential VINT1 of the potential detecting line INT1. For example, the control circuit 211 converts the potential VINT1 to a digital value using an AD converter and, then, measures the potential VINT1 based on the digital value.

The potential VINT1 of the potential detecting line INT1 is determined by the variable resistance element Ru1 provided in the host controller 21 and plural resistance elements Rd1, Rd2 coupled to the potential detecting line INT1 together with the variable resistance element Ru1.

If the potential VINT1 falls out of the predefined range (e.g. out of a range from 0.2 to 0.8 times as large as the power supply voltage VDD) (NO as decided at step S202), the control circuit 211 regulates the resistance value of the variable resistance element Ru1 so that the potential VINT1 will fall within the predefined range (step S204).

When the potential VINT1 becomes falling within the predefined range (YES as decided at step S202), the host controller 21 starts data communication with the modules 22_1 to 22_n (main operation) (step S203).

During main operation, the control circuit 211 measures the potential VINT1 periodically (e.g., once for 1 ms).

If no change in the potential VINT1 has been made (NO as decided at step S205), the host controller continues the main operation (No as decided at step S206→step S203), judging that none of the modules 22_1 to 22_n has been decoupled from the communication bus B1 and a new module has not been coupled to the communication bus B1. Upon completion of the main operation (YES as decided at step S206), for example, the operation terminates (step S207).

But, if change in the potential VINT1 has been made (YES as decided at step S205), then, the polarity of change of the potential VINT1 is judged.

If, for example, a negative change in the potential VINT1 has been made (NO as decided at step S208), it means that a new module has been coupled to the communication bus B1. In this case, the host controller 21 performs again a processing step to know what modules are being coupled to the communication bus B1 (step S201). Subsequently, the processing steps S202 to S208 are executed.

On the other hand, if a positive change in the potential VINT1 has been made (YES as decided at step S208), it means that a module coupled to the communication bus B1 has been decoupled.

Here, if a module for which a high degree of urgency is set has been decoupled from the communication bus B1, the variation ΔVINT1 of the potential VINT1 becomes larger than if a module for which a low degree of urgency was set has been decoupled from the communication bus B1. Depending on whether this variation ΔVINT1 is relatively large or small, the degree of urgency set for a module which has been decoupled from the communication bus B1 is judged high or low.

If, for example, a module for which a low degree of urgency is set has been decoupled from the communication bus B1 (NO as decided at step S213), the host controller 21 identifies what module has been decoupled from the communication bus B1 (step S209). Then, if having received a "deactivate" command (YES as decided at step S210), the host controller terminates the operation (step S211); unless having received a "deactivate" command (NO as decided at step S210), the host controller continues the operation (step S201).

On the other hand, if a module for which a high degree of urgency is set has been decoupled from the communication bus B1 (YES as decided at step S213), the host controller 21 terminates the operation (step S211) without identifying what module has been decoupled from the communication bus B1.

The semiconductor system 2 pertaining to the present embodiment can produce an advantageous effect that is virtually equivalent to that produced by the semiconductor system 1. Moreover, the semiconductor system 2 pertaining to the present embodiment enables setting a degree of urgency for each module and, therefore, makes it possible to perform processing depending on the degree of urgency set for a module decoupled from the communication bus B1.

In the present embodiment, all of plural resistance elements Rd1 provided in each of the modules 22_1 to 22_n have substantially the same value of resistance and all of plural resistance elements Rd2 provided in each of the modules 22_1 to 22_n have substantially the same value of resistance. That is, the resistance elements Rd1 provided in each of the modules 22_1 to 22_n do not need to be set to different resistance values and the resistance elements Rd2 do not need to be set to different resistance values. Therefore, it is not required to store all the resistance values of the resistance elements Rd1, Rd2 provided in each of the modules 22_1 to 22_n.

Besides, in the present embodiment, different degrees of urgency can be set for plural modules of the same type.

Therefore, different steps of processing can be performed for a case in which a module for which a low degree of urgency is set, one of the modules of the same type, has been decoupled from the communication bus B1 and for a case in which a module for which a high degree of urgency is set, one of the modules of the same type, has been decoupled from the communication bus B1.

Third Embodiment

Figure 6:
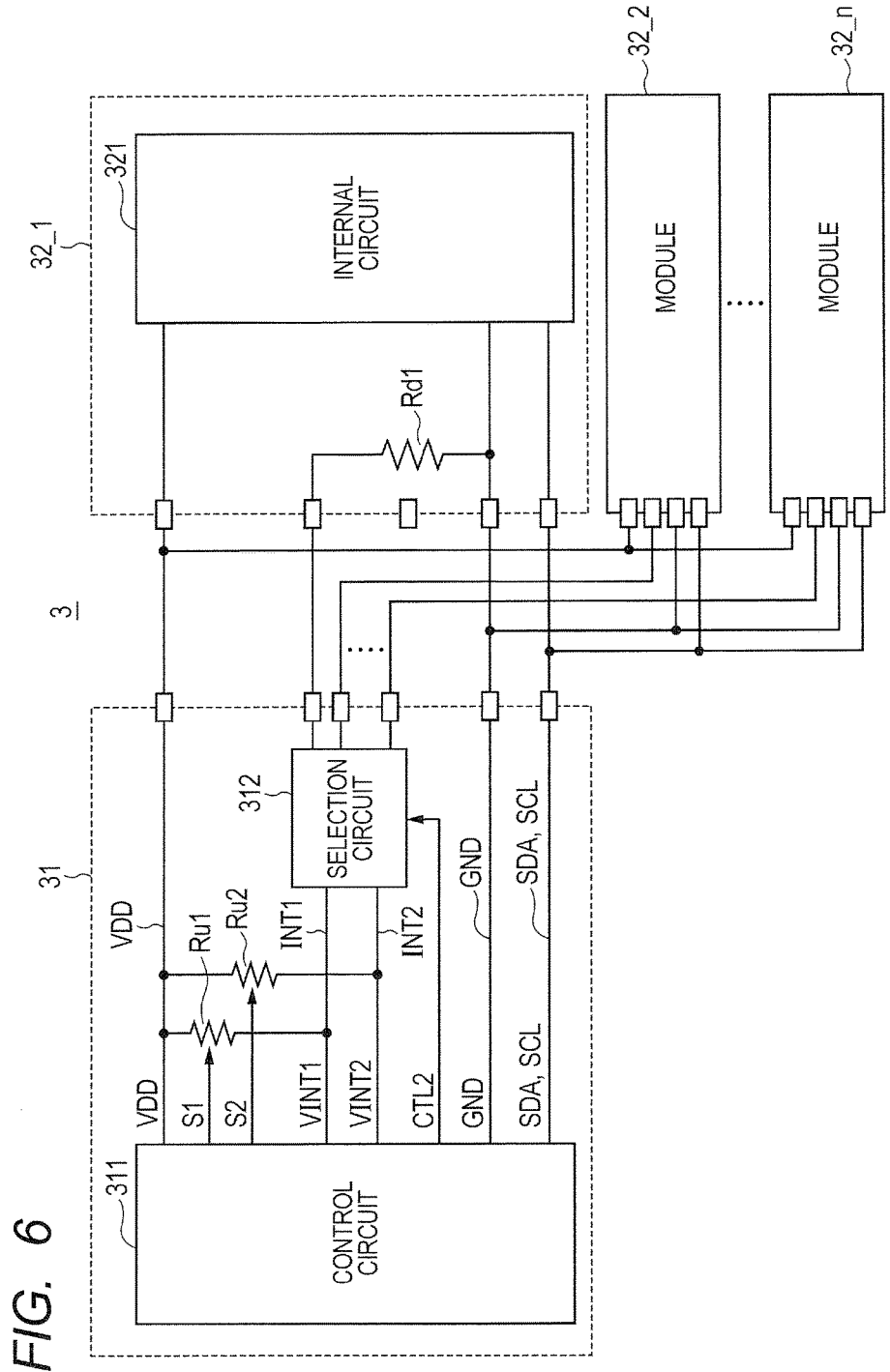
FIG. 6 is a block diagram depicting an example of configuration of a semiconductor system pertaining to a third embodiment.

FIG. 6 is a diagram depicting an example of configuration of a semiconductor system 3 pertaining to a third embodiment.

In comparison with the semiconductor system 1, difference lies in the configuration of a host controller in the semiconductor system 3. Concrete descriptions will be provided below.

As depicted in FIG. 6, the semiconductor system 3 includes a host controller (semiconductor device) 31, modules 32_1 to 32_n (where n is an integer more than 1), a communication bus B1 which couples the host controller 31 with the modules 32_1 to 32_n, and potential detecting lines (first and second potential detecting lines) INT1, INT2. The host controller 31 and modules 32_1 to 32_n correspond to the host controller 11 and modules 12_1 to 12_n respectively.

Host Controller 31

The host controller 31 includes a control circuit 311, a variable resistance element (first variable resistance element) Ru1, a variable resistance element (second variable resistance element) Ru2, and a selection circuit (second selection circuit) 312. The control circuit 311 corresponds to the control circuit 111.

The variable resistance element Ru1 is provided between the power supply line VDD and the potential detecting line INT1 and its resistance value is varied by a control signal S1 from the control circuit 311. The variable resistance element Ru2 is provided between the power supply line VDD and the potential detecting line INT2 and its resistance value is varied by a control signal S2 from the control circuit 311. That is, in the present example, both the variable resistance elements Ru1, Ru2 are used as pull-up resistors.

The selection circuit 312 is provided between the potential detecting lines INT1, INT2 and a resistance element Rd1 in each of the modules 32_1 to 32_n and couples the resistance element Rd1 in each of the modules 32_1 to 32_n to either of the potential detecting lines INT1, INT2 according to a control signal CTL2 from the control circuit 311.

Figure 7:
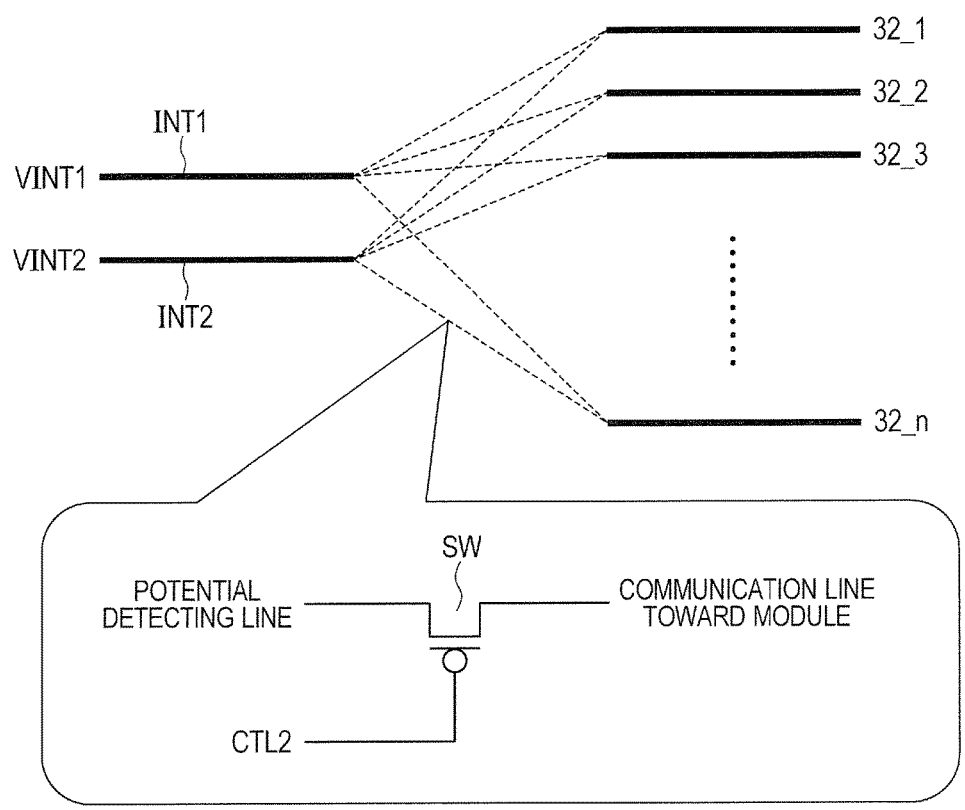
FIG. 7 is a schematic diagram depicting a selection circuit provided in a host controller of the semiconductor system depicted in FIG. 6.

FIG. 7 is a schematic diagram depicting the selection circuit 312.

As depicted in FIG. 7, the selection circuit 312 includes plural switches SWs provided in matrix form between the potential detecting line INT1, INT2 and a resistance element Rd1 in each of the modules 32_1 to 32_n. Each switch SW is, for example, a P-channel MOS transistor and on/off controlled by a value of the control signal CTL2. In the present example, the number of switches SWs is 2n pieces (=the number of potential detecting lines×the number of modules).

Modules 32_1 to 32_n

A module 32_1 includes an internal circuit 321 and a resistance element Rd1. The internal circuit corresponds to the internal circuit 121. The resistance element Rd1 may be provided externally to the module 32_1. That is, the resistance element Rd1 may be externally attached to the module 32_1.

The configurations of modules 32_2 to 32_n are the same as for the module 32_1 and, therefore, their descriptions are omitted.

Operation of the Semiconductor System 3

Subsequently, operation of the semiconductor system 3 is described.

Figure 8:
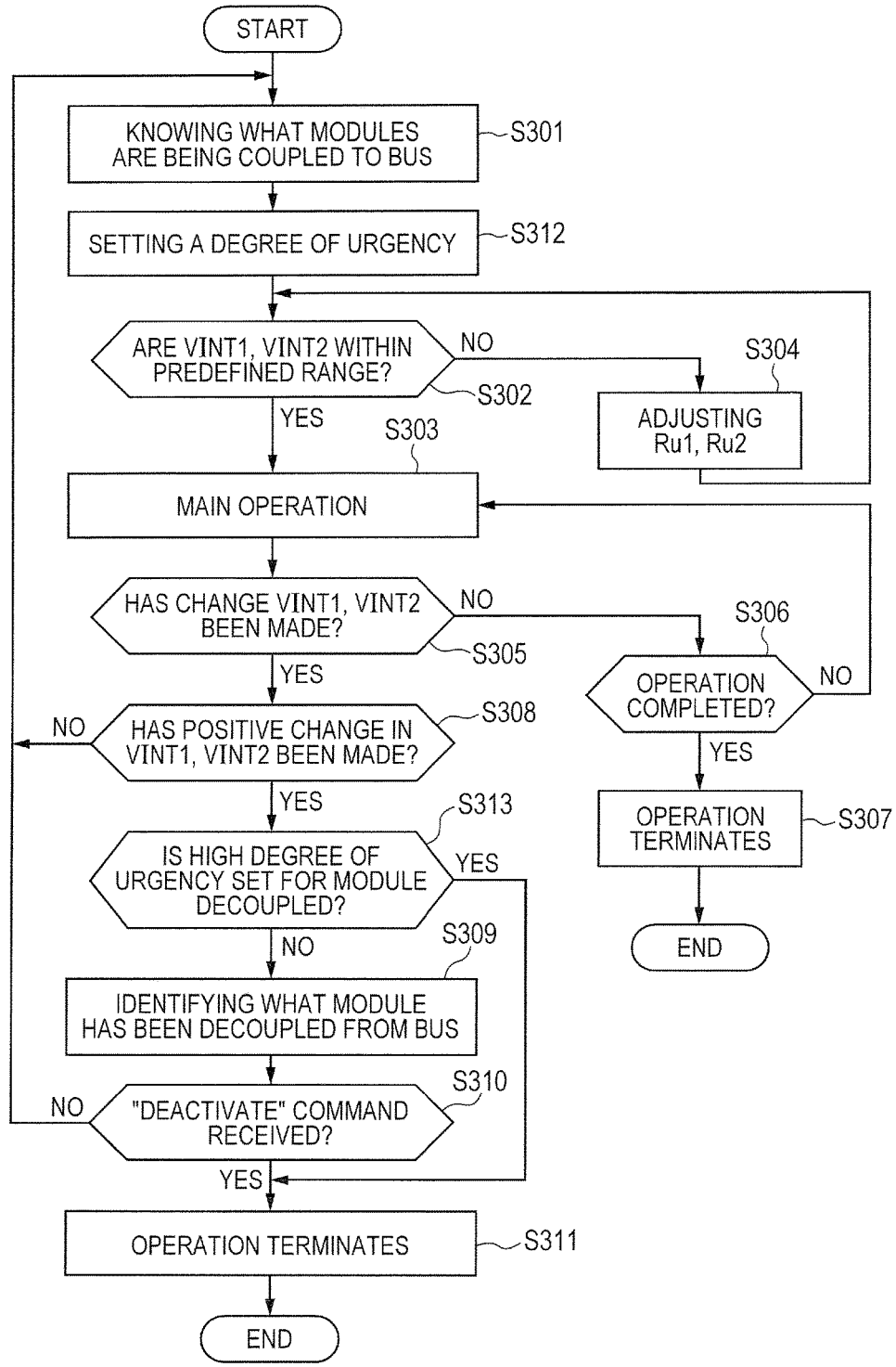
FIG. 8 is a flowchart illustrating operation of the semiconductor system depicted in FIG. 6.

FIG. 8 is a flowchart illustrating operation of the semiconductor system 3.

When the semiconductor system 3 is started up, first, the host controller 31 performs a processing step to know what modules 32_1 to 32_n are being coupled to the communication bus B1 (step S301).

After that, the host controller 31 sets a degree of urgency for each of the modules 32_1 to 32_n (step S312). In particular, the control circuit 311 sends each of the modules 32_1 to 32_n a command to couple the resistance element Rd1 in each of the modules 32_1 to 32_n to either of the potential detecting lines INT1, INT2. In an initial state, the resistance element Rd1 in each of the modules 32_1 to 32_n is coupled to the potential detecting line INT1.

For example, a high degree of urgency should be set for a module such as a motor, as the system operation has to be terminated immediately when the module has been decoupled from the communication bus B1. In particular, the resistance element Rd1 should be coupled to the potential detecting line INT1, of either of the potential detecting lines INT1, INT2. On the other hand, a low degree of urgency should be set for a module such as a display, as the system operation does not have to be terminated immediately even when the module has been decoupled from the communication bus B1. In particular, the resistance element Rd1 should be coupled to the potential detecting line INT2, of either of the potential detecting lines INT1, INT2.

After that, the control circuit 311 measures the respective potentials VINT1, VINT2 of the potential detecting lines INT1, INT2. For example, the control circuit 311 converts the potentials VINT1, VINT2 to digital values using an AD converter and, then, measures the potentials VINT1, VINT2 based on the digital values.

The potential VINT1 of the potential detecting line INT1 is determined by the variable resistance element Ru1 provided in the host controller 31 and one or more resistance elements Rd1 coupled to the potential detecting line INT1 together with the variable resistance element Ru1. The potential VINT2 of the potential detecting line INT2 is determined by the variable resistance element Ru2 provided in the host controller 31 and one or more resistance elements Rd1 coupled to the potential detecting line INT2 together with the variable resistance element Ru2.

If the potential VINT1 falls out of the predefined range (e.g. out of a range from 0.2 to 0.8 times as large as the power supply voltage VDD) (NO as decided at step S302), the control circuit 311 regulates the resistance value of the variable resistance element Ru1 so that the potential VINT1 will fall within the predefined range (step S304). Likewise, if the potential VINT2 falls out of the predefined range (NO as decided at step S302), the control circuit 311 regulates the resistance value of the variable resistance element Ru2 so that the potential VINT2 will fall within the predefined range (step S304).

When the potentials VINT1, VINT2 become falling within the predefined range (YES as decided at step S302), the host controller 31 starts data communication with the modules 32_1 to 32_n (main operation) (step S303).

During main operation, the control circuit 311 measures the potentials VINT1, VINT2 periodically (e.g., once for 1 ms).

If no change in the potentials VINT1, VINT2 has been made (NO as decided at step S305), the host controller continues the main operation (No as decided at step S306→step S303), judging that none of the modules 32_1 to 32_n has been decoupled from the communication bus B1 and a new module has not been coupled to the communication bus B1. Upon completion of the main operation (YES as decided at step S306), for example, the operation terminates (step S307).

But, if change in either of the potentials VINT1, VINT2 has been made (YES as decided at step S305), then, the polarity of change of the potential VINT1 or VINT2 is judged.

If, for example, a negative change in the potential VINT1 has been made (NO as decided at step S308), it means that the a new module for which a high degree of urgency is set has been coupled to the communication bus B1. If a negative change in the potential VINT2 has been made (NO as decided at step S308), it means that a new module for which a low degree of urgency is set has been coupled to the communication bus B1.

In this case, the host controller 31 performs again a processing step to know what modules are being coupled to the communication bus B1 (step S301). Subsequently, the processing steps S302 to S308 are executed.

On the other hand, if a positive change in the potential VINT1 has been made (YES as decided at step S308), it means that a module for which a high degree of urgency is set, coupled to the communication bus B1, has been decoupled. If a positive change in the potential VINT2 has been made (YES as decided at step S308), it means that a module for which a low degree of urgency is set, coupled to the communication bus B1, has been decoupled.

Put plainly, depending on which of the potentials VINT1, VINT2 has been changed, the degree of urgency set for a module which has been decoupled from the communication bus B1 is judged high or low.

If, for example, a module for which a low degree of urgency is set has been decoupled from the communication bus B1 (NO as decided at step S313), the host controller 31 identifies what module has been decoupled from the communication bus B1 (step S309). Then, if having received a "deactivate" command (YES as decided at step S310), the host controller terminates the operation (step S311); unless having received a "deactivate" command (NO as decided at step S310), the host controller continues the operation (step S301).

On the other hand, if a module for which a high degree of urgency is set has been decoupled from the communication bus B1 (YES as decided at step S313), the host controller 31 terminates the operation (step S311) without identifying what module has been decoupled from the communication bus B1.

The semiconductor system 3 pertaining to the present embodiment can produce an advantageous effect that is virtually equivalent to that produced by the semiconductor system 1. Moreover, the semiconductor system 3 pertaining to the present embodiment enables setting a degree of urgency for each module and, therefore, makes it possible to perform processing depending on the degree of urgency set for a module decoupled from the communication bus B1. Furthermore, in the semiconductor system 3 pertaining to the present embodiment, there is no need to switch between resistance elements in each module and, therefore, the cost of designing a module can be reduced.

In the present embodiment, all of plural resistance elements Rd1 provided in each of the modules 32_1 to 32_n have substantially the same value of resistance. That is, the resistance elements Rd1 provided in each of the modules 32_1 to 32_n do not need to be set to different resistance values. Therefore, it is not required to store all the resistance values of the resistance elements Rd1 and Rd2 provided in each of the modules 32_1 to 32_n.

Besides, in the present embodiment, different degrees of urgency can be set for plural modules of the same type. Therefore, different steps of processing can be performed for a case in which a module for which a low degree of urgency is set, one of the modules of the same type, has been decoupled from the communication bus B1 and for a case in which a module for which a high degree of urgency is set, one of the modules of the same type, has been decoupled from the communication bus B1.

As will be appreciated from the foregoing, each of the semiconductor systems pertaining to the first and third embodiments described hereinbefore includes the potential detecting line INT1 through which the potential VINT1 for detecting the coupling of a module to the communication bus B1 and the decoupling of a module from the communication bus B1 is generated. The host controller provided in the semiconductor system regulates the resistance value of the variable resistance element Ru1 so that the potential VINT1 of the potential detecting line INT1 which is determined by the variable resistance element Ru1 and a resistance element Rd1 which is provided in each module will fall within a predefined range. It is thus possible to keep the potential VINT1 varying greatly to a certain extent or more due to, inter alia, the coupling of a module to the communication bus B1 and the decoupling of a module from the communication bus B1. It is therefore possible to correctly judge that a module has been coupled to the communication bus B1 and a module has been decoupled from the communication bus B1 among others.

While the invention made by the present inventors has been described specifically based on its embodiments, it will be appreciated that the present invention is not limited to the previously described embodiments and various modifications may be made thereto without departing from the gist of the invention.

For instance, the semiconductor devices pertaining to the foregoing embodiments may be configured such that the conductivity type (p-type or n-type) of a semiconductor substrate, semiconductor layer, diffusion layer (diffusion region), etc. is inverted. Therefore, given that one of n-type and p-type is a first conductivity type and the other is a second conductivity type, it is possible that the first conductivity type is p-type and the second conductivity type is n-type; inversely, it is also possible that the first conductivity type is n-type and the second conductivity type is p-type.

What is claimed is:

1. A semiconductor device comprising:
   a first variable resistance element; and
   a control circuit that varies a resistance value of the first variable resistance element so that a potential of a first potential detecting line which is determined by the first variable resistance element and a first resistance element, one of which is respectively provided in each of one or more external modules, falls within a predefined range,
   wherein the predefined potential range permits a determination of a connection status of the one or more external modules to the semiconductor device as based on the potential of the first potential detecting line.

2. The semiconductor device according to claim 1, wherein the control circuit judges whether or not each of the one or more modules is being coupled to the semiconductor device through a signal line in accordance with the potential of the first potential detecting line determined after the resistance value of the first variable resistance element is varied.

3. The semiconductor device according to claim 1, wherein each of the one or more modules further comprises:
a second resistance element which is provided in parallel with the first resistance element and has a resistance value different from the resistance value of the first resistance element; and
a first selection circuit which couples one of the first and second resistance elements to the first potential detecting line in accordance with a control signal output from the control circuit, and
wherein the control circuit varies the resistance value of the first variable resistance element so that the potential of the first potential detecting line which is determined by the first variable resistance element and one or more resistance elements selected by the first selection circuit between the first and second resistance elements provided in each of the one or more modules will fall within the predefined range.

4. The semiconductor device according to claim 1, further comprising:
a second variable resistance element coupled to a second potential detecting line; and
a second selection circuit which couples the first resistance element provided in each of the one or more modules to either of the first potential detecting line and the second potential detecting line in accordance with a control signal output from the control circuit,
wherein the control circuit varies the resistance value of the first variable resistance element so that the potential of the first potential detecting line which is determined by the first variable resistance element and one or more first resistance elements coupled to the first potential detecting line together with the first variable resistance element will fall within the predefined range, and
wherein the control circuit varies the resistance value of the second variable resistance element so that the potential of the second potential detecting line which is determined by the second variable resistance element and one or more first resistance elements coupled to the second potential detecting line together with the second variable resistance element will fall within the predefined range.

5. A semiconductor system comprising:
a semiconductor device as set forth in claim 1;
one or more modules;
a signal line which couples the semiconductor device and each of the one or more modules; and
the first potential detecting line which couples the first variable resistance element provided in the semiconductor device with the first resistance element provided in each of the one or more modules.

6. A semiconductor system comprising:
a semiconductor device as set forth in claim 3;
one or more modules;
a signal line which couples the semiconductor device and each of the one or more modules; and
the first potential detecting line which couples the first variable resistance element provided in the semiconductor device and either resistance element selected by the first selection circuit between the first and second resistance elements provided in each of the one or more modules.

7. A semiconductor system comprising:
a semiconductor device as set forth in claim 4;
one or more modules;
a signal line which couples the semiconductor device and each of the one or more modules;
the first potential detecting line which couples the first variable resistance element provided in the semiconductor device with a part of first resistance elements provided respectively in the one or more modules; and
the second potential detecting line which couples the second variable resistance element provided in the semiconductor device with the remaining part of first resistance elements provided respectively in the one or more modules.

8. A semiconductor device control method comprising:
varying a resistance value of a first variable resistance element so that a potential of a first potential detecting line, which is determined by the first variable resistance element and a first resistance element which is respectively provided in each of one or more external modules, falls within a predefined range; and
judging whether one or more of the one or more modules is coupled to the semiconductor device through a signal line, in accordance with the potential of the first potential detecting line determined after the resistance value of the first variable resistance element is varied.

9. The semiconductor device control method according to claim 8, further comprising:
coupling one of the first resistance element and a second resistance element having different resistance value from the resistance value of the first resistance element, provided in parallel in each of the one or more modules, to the first potential detecting line,
wherein the varying the resistance value of the first variable resistance element comprises varying the resistance value of the first variable resistance element so that the potential of the first potential detecting line which is determined by the first variable resistance element and one or more resistance elements coupled to the first potential detecting line, of either of the first and second resistance elements provided in each of the one or more modules, falls within the predefined range.

10. The semiconductor device control method according to claim 8, further comprising:
coupling the first resistance element provided in each of the one or more modules to either of the first potential detecting line coupled to the first variable resistance element and a second potential detecting line coupled to a second variable resistance element,
wherein the varying the resistance value of the first variable resistance element comprises:
varying the resistance value of the first variable resistance element so that the potential of the first potential detecting line which is determined by the first variable resistance element and one or more first resistance elements coupled to the first potential detecting line together with the first variable resistance element falls within the predefined range; and
varying the resistance value of the second variable resistance element so that the potential of the second potential detecting line which is determined by the second variable resistance element and one or more first resistance elements coupled to the second potential detecting line together with the second variable resistance element falls within the predefined range.

11. The semiconductor device control method according to claim 8, wherein the signal line comprises a signal line of a bus.

12. The semiconductor device control method according to claim 11, wherein the bus comprises an Inter-Integrated Circuit (I2C) bus.

13. The semiconductor device control method according to claim 8, wherein a change in the potential of the first potential detecting line permits a determination of whether a new module has been coupled or one of the modules has been decoupled.

14. The semiconductor device control method according to claim 12, wherein a positive change in the potential indicates that a module has been decoupled and a negative change in the potential indicates that a new module has been coupled.

15. The semiconductor device control method according to claim 8, further comprising determining which modules are coupled.

16. The semiconductor device according to claim 2, wherein the signal line comprises a signal line of a bus.

17. The semiconductor device according to claim 16, wherein the bus comprises an Inter-Integrated Circuit (I2C) bus.

18. The semiconductor device according to claim 1, wherein a change in the potential of the first potential detecting line permits a determination of whether a new module has been coupled or one of the modules has been decoupled.

19. The semiconductor device according to claim 18, wherein a positive change in the potential indicates that a module has been decoupled and a negative change in the potential indicates that a new module has been coupled.

20. The semiconductor device according to claim 1, wherein the control circuit further determines which modules are coupled.

* * * * *